UNITED STATES PATENT OFFICE.

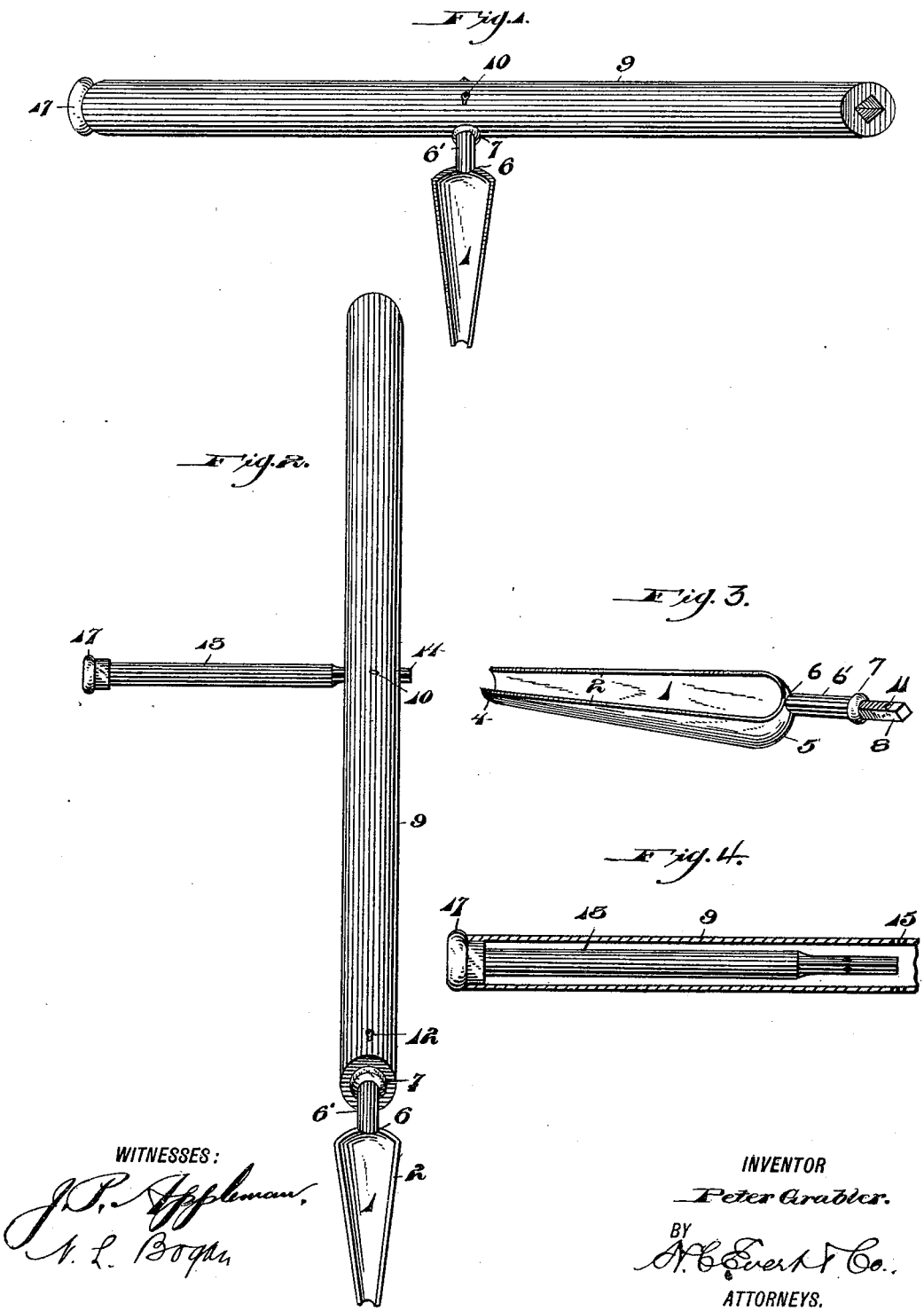

PETER GRABLER, OF MANSFIELD, OHIO.

REVERSIBLE REAMER.

SPECIFICATION forming part of Letters Patent No. 644,595, dated March 6, 1900.

Application filed February 7, 1899. Serial No. 704,784. (No model.)

*To all whom it may concern:*

Be it known that I, PETER GRABLER, a citizen of the United States of America, residing at Mansfield, in the county of Richland and State of Ohio, have invented certain new and useful Improvements in Reversible Reamers, of which the following is a specification, reference being had therein to the accompanying drawings.

My invention relates to certain new and useful improvements in reversible reamers.

One object of my invention is to construct a reamer of this character which will cut when turned to either the right or left.

A further object of my invention is to construct a reamer of this character which is adapted for reaming the burs from the inner face of the ends of gas or other pipes.

A further object of my invention is to construct a reamer of this class which will be extensible and adapted for use by steam-fitters when desired to ream a hole in the steam or other pipes of furnaces.

A further object of my invention is to provide a reamer of this character with a lever to assist the operation of reaming.

A further object of my invention is to construct a reamer of this character adapted for use for various sizes of pipes.

A further object of my invention is to construct a reamer of this character having the cutting-surface thereof flat.

A further object of my invention is to provide a reamer or pod so that the same can be adjusted or operated when secured either to the side or the ends of the handle therefor.

A further object of my invention is to construct a reamer or pod to allow of its sharpening until completely worn away.

My invention finally consists in the novel combination and arrangement of parts hereinafter more fully described, and particularly pointed out in the claims.

In describing the invention in detail reference is had to the accompanying drawings, forming a part of this specification, wherein like numerals of reference indicate corresponding parts throughout the several views thereof, and in which—

Figure 1 is a perspective view of my improved reamer attached to the side of its handle. Fig. 2 is a side view of the reamer or pod secured to one end of the handle, also the lever secured to the side of the handle in position for use. Fig. 3 is a perspective view of my improved reamer. Fig. 4 is a longitudinal sectional view of a portion of the handle, showing the arrangement of the lever therein.

Heretofore the cutting edge on this class of borers, reamers, or pods has been formed by grinding or chamfering from the inside out and from the outside in, thus forming a thin cutting edge which would dull very quickly, therefore necessitating the repeated sharpening of the pod or reamer to obtain the proper cutting edge at a great disadvantage and at a loss of time. These objections are obviated by providing the reamer or pod with a flat cutting surface, the edges thereof forming the cutting means. At the same time I construct the pod or reamer in such a manner that the same can be sharpened until completely worn away.

Owing to the cutting-surface being flat and the edge thereof forming the cutting means, the same can be sharpened without the least trouble, thereby obtaining a saving of time and overcoming the objections heretofore stated. Furthermore, by the adoption of the adjustable handle for securing the reamer or pod in its operating position various positions can be secured for reaming which could not be obtained in devices heretofore in use. Furthermore, by constructing the reamer or pod in the manner shown the same is adapted to cut when turned to either the right or left in the cutting operation.

Referring now to the drawings by reference-numerals, 1 indicates a reamer or pod constructed of suitable metallic material, semicircular in its transverse sections, diminishing in diameter from its head downward, and is substantially tapering in contour, the cutting-surfaces 2 being flat and the edges thereof forming the cutting means while reaming. The lower end of the reamer or pod is beveled, as at 4, to assist the forward movement thereof when operating.

The upper portion of the reamer or pod 1 is provided with a hemispherical head 5. This head 5 has formed integral therewith, as at 6, the shank 6', having a concentric flange formed thereon, as at 7, and an extension 8, which is adapted to secure the reamer in position by inserting the same in the sides of the handle 9 and secured by means of the fastening-pin 10, operating through an aperture formed in the side of the reamer at the end thereof and through an aperture 11, formed in the extension 8. The extension 8 when inserted in the handle at the end thereof passes through an aperture formed therein and is secured in position by means of the pin 12, operating through an aperture formed in the handle and the aperture 11 of the extension.

The handle 9 may be of any desirable length and is constructed of a cylindrical hollow tubing of any desirable material.

13 indicates a lever, the one end thereof, 14, being of the same shape as the enlarged aperture 15, arranged in the handle. The lever 13 is provided with a head 17 and when the lever is not in use is adapted to be inserted in the handle 9, as shown in Fig. 4.

When it is desired to use the lever, the same is inserted in the enlarged aperture 15, as shown in Fig. 2 of the drawings.

It is thought that the many advantages of my improved reamer can be readily understood from the foregoing description taken in connection with the accompanying drawings.

It will be noted that various changes may be made in the details of construction without departing from the general spirit of my invention.

Having thus fully described my invention, what I claim as new, and desired to secure by Letters Patent, is—

1. In a device of the character described, a hollow pod or reamer having a continuous taper from one end to the other with flat cutting edges to permit the operation of the pod in either direction, said pod being open at its smaller end and closed at its larger end with a shank connected to the closed end, combined with a detachable operating-handle having means for securing to the shank either at the end or side of the handle, substantially as shown and described.

2. In combination a pod or reamer having a flat cutting-surface, the edges of said surface allowing for the operation of the pod in either direction, the lower end of said reamer or pod being beveled, a head formed integral with the upper end of said reamer or pod, a handle, means carried by said head for securing the reamer or pod to the end or side of the said handle, and a lever adapted to be connected to the said handle to assist in the operation of said reamer, substantially as set forth.

In testimony whereof I affix my signature in the presence of two witnesses.

PETER GRABLER.

Witnesses:
J. M. REED,
C. N. McCLELLAN.